(12) United States Patent
Whitton et al.

(10) Patent No.: US 12,360,820 B1
(45) Date of Patent: Jul. 15, 2025

(54) DYNAMIC MULTIFACTOR RESOURCE DISTRIBUTION AMONG COARSE BUCKETS

(71) Applicant: Pacific Investment Management Company LLC, Newport Beach, CA (US)

(72) Inventors: Bransby Macdonald Whitton, Newport Beach, CA (US); Rene Martel, Newport Beach, CA (US); Klaus Dieter Thuerbach, Newport Beach, CA (US); Steven Guy Sapra, Dana Point, CA (US); Niels Kjaergaard Pedersen, Corona Del Mar, CA (US)

(73) Assignee: Pacific Investment Management Company LLC, Newport Beach, CA (US)

( * ) Notice: Subject to any disclaimer, the term of this patent is extended or adjusted under 35 U.S.C. 154(b) by 649 days.

(21) Appl. No.: 17/447,872

(22) Filed: Sep. 16, 2021

Related U.S. Application Data

(60) Provisional application No. 63/079,345, filed on Sep. 16, 2020.

(51) Int. Cl.
*G06F 9/50* (2006.01)
*G06N 20/00* (2019.01)

(52) U.S. Cl.
CPC ........... *G06F 9/5061* (2013.01); *G06N 20/00* (2019.01)

(58) Field of Classification Search
None
See application file for complete search history.

(56) References Cited

U.S. PATENT DOCUMENTS

| 8,275,688 | B2 | 9/2012 | Abidi | |
|---|---|---|---|---|
| 8,386,360 | B2 | 2/2013 | Abidi et al. | |
| 2008/0183638 | A1* | 7/2008 | Chigirinskiy | G06Q 40/06 705/36 R |
| 2009/0281959 | A1* | 11/2009 | Abidi | G06Q 40/06 705/36 R |

(Continued)

OTHER PUBLICATIONS

Moore et al., "The PIMCO Guide Path Construction Process", PIMCO quantitative research, https://www.pimco.com/handlers/displaydocument.ashx?fn=PIMCO_QRA_Glidepath_Moore_Sapra_Pedersen_Jun2017.pdf&id=zdVcShqiEMNUg7uf5lz9gz%2FfdtpZAxKCLsuDGmVqEEL9K6VxjAwuETyKmVNZSF6m%2BcwmMMY724kVAjVehk1ya6fz3ELNCiDJbrNwMbtWtozAkjCDLNE6JnGRN4SvPkXrkfMXXWZ%2FG9JbKOYT7CTnR%2Fcjulae6UxSAOryZ9paMv43z9Pw8Gj%2BLuiecPrLww1GSf9Bg8QJS6U2TKYW3hVWzNnBiL8bJqdyQdpq11q9DaHVgZrBy9mDO9%2BdvQPj92C%2BI0MhLO5N5cPnVMJS%2Bb0wu6v9BG3xxstLvA97HCuTXcABp7JtFBOYW7d9P3Z%2BWJ%2BNmEKPHJ6a8ri4nTG1ukQhiWfHc4nGkiJXce%2B8yhNEIAla71xSCV44JPwOxyvbT5lhJxOYcBfT9%2B%2BSGxxW2%2B0uHrbBs4loJ92EotLt3MKjQDU8NgD%2Fp0q6jgOFgtILNYfzhn8ifV5RsgajedCWmGMpqfwkVVpb9iULyYVjV0V8LUWG2NJxGTIFromOA%2FDNA3sO, downloaded Mar. 10, 2023, 12 pages; Jun. 2017.

*Primary Examiner* — Umut Onat
(74) *Attorney, Agent, or Firm* — Knobbe, Martens, Olson & Bear, LLP

(57) ABSTRACT

Systems and methods are provided to create a comprehensive set of asset mixtures that identifies particular mixtures of target data vehicles for different combinations of metric values. The system can identify a plurality of potential combinations of metric values. The system can identify a target asset mixture for each combination of metric values. The system may identify a set of available asset allocations and an asset definition for each of the set of available asset (Continued)

allocations. Based on the asset definition for each of the set of available asset allocations, the system can dynamically map the target asset mixture for each combination of metric values to particular asset definitions. Based on the dynamic mapping, the system can determine a particular mixture of target date vehicles for each combination of metric values and dynamically generate a comprehensive set of asset mixtures.

20 Claims, 9 Drawing Sheets

(56) References Cited

U.S. PATENT DOCUMENTS

| | | | |
|---|---|---|---|
| 2010/0017338 A1* | 1/2010 | Gorbatovsky | G06Q 40/04 705/36 R |
| 2011/0040581 A1* | 2/2011 | Wirth | G06Q 40/08 705/36 R |
| 2013/0018818 A1* | 1/2013 | Yadav | G06Q 40/06 705/36 R |
| 2017/0213288 A1* | 7/2017 | Zhang | G06Q 40/06 |

* cited by examiner (3) Implementation: approximating optimal allocation with existing target date building blocks

| | Mkt Avg | Mike | Jane | Liz |
|---|---|---|---|---|
| Customized Equity Allocation: | 66% | 75% | 77% | 58% |
| Customized TD Selection: | | | | |
| Target Date 2030 | 0% | 0% | 0% | 76% |
| Target Date 2035 | 100% | 0% | 0% | 24% |
| Target Date 2040 | 0% | 100% | 44% | 0% |
| Target Date 2045 | 0% | 0% | 56% | 0% |

- Current Target Date Vehicles are optimized to the average participant
- Participants are unique
- Different inputs lead to different solutions
- Using existing building blocks (i.e. PIMCO Funds) offers ease of implementation

FIG. 3C

| Participant | Age | Gender | Income | Plan Assets | Deferral Rate | Employer Contribution Rate |
|---|---|---|---|---|---|---|
| 1 | 51 | Female | $77,000 | $313,248 | 5% | 8% |
| 2 | 43 | Male | $131,000 | $129,694 | 6% | 6% |
| 3 | 46 | Male | $115,000 | $381,104 | 2% | 1% |

| Variable | 1 | 2 | 3 | 4 | 5 |

|  | # of discrete buckets | Ranges |
|---|---|---|
| Age | 50 | {<25, 26, ..., 74, >75} |
| Gender | 2 | {male, female} |
| Income | 30 | {<20k, 25k, 30k, ..., 70k, 80k, 100k, ..., >500k} |
| Plan Assets | 30 | {<20k, 30k, ..., 80k, 100k, ..., >2,000k} |
| Total Contribution | 25 | {<1%, 2%, 3%, ..., 35%, >40%} |

- Each cell in the allocation matrix represents today's optimal asset allocation for each given participant
- Annual update of fully developed allocation matrix
- New capital market assumptions drive update to allocation matrix
- Change in participant's situation moves her within the allocation matrix

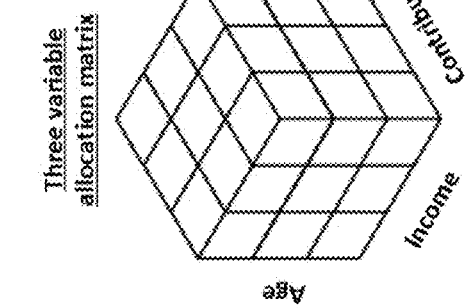

Three variable allocation matrix

FIG. 3D

DYNAMIC MULTIFACTOR RESOURCE DISTRIBUTION AMONG COARSE BUCKETS

INCORPORATION BY REFERENCE TO ANY PRIORITY APPLICATIONS

This application claims the benefit of priority of U.S. Provisional Patent Application No. 63/079,345 filed Sep. 16, 2020, entitled "DYNAMIC MULTIFACTOR RESOURCE DISTRIBUTION AMONG COARSE BUCKETS," which is hereby incorporated by reference herein in its entirety and for all purposes.

Any and all applications for which a foreign or domestic priority claim is identified in the Application Data Sheet as filed with the present application are hereby incorporated by reference under 37 CFR 1.57.

SUMMARY

The systems, methods, and devices described herein each have several aspects, no single one of which is solely responsible for its desirable attributes. Without limiting the scope of this disclosure, several non-limiting features will now be described briefly.

According to various embodiments of the present disclosure, a method can include identifying a plurality of potential combinations of metric values. The method may further include, for each potential combination of metric values of the plurality of potential combinations of metric values, accessing a plurality of metric values associated with the potential combination of metric values. The plurality of metric values may correspond to a plurality of metrics associated with determining ideal equity ratios for each of the plurality of potential combinations of metric values. The method may further include, for each potential combination of metric values of the plurality of potential combinations of metric values, determining a target asset mixture for the potential combination of metric values based at least in part on the plurality of metric values. The target asset mixture may be based at least in part on a set of asset allocations. The method may further include, for each potential combination of metric values of the plurality of potential combinations of metric values, identifying a set of available asset allocations that includes a mixture of equities and fixed income allocations. The method may further include, for each potential combination of metric values of the plurality of potential combinations of metric values, determining an asset definition for each of the set of available asset allocations. The method may further include, for each potential combination of metric values of the plurality of potential combinations of metric values, dynamically mapping the target asset mixture of the potential combination of metric values to the asset definition for each of the set of available asset allocations. The method may further include, for each potential combination of metric values of the plurality of potential combinations of metric values, determining a particular mixture of available asset allocations for the potential combination of metric values based at least in part on dynamically mapping the target asset mixture of the potential combination of metric values to the asset definition for each of the set of available asset allocations. The particular mixture of available asset allocations is a weighted mixture of a plurality of available asset allocations selected from the set of available asset allocations to satisfy the target asset mixture for the potential combination of metric values. The method may further include dynamically generating a comprehensive set of asset mixtures. The comprehensive set of asset mixtures includes the particular mixture of available asset allocations of each potential combination of metric values of the plurality of potential combinations of metric values.

In various embodiments, the method may include obtaining, from the user computing device, a request to access the comprehensive set of asset mixtures. The method may further include verifying an account associated with the user computing device and transmitting, to the user computing device, the comprehensive set of asset mixtures.

In various embodiments, the method may include transmitting, to a user computing device, the comprehensive set of asset mixtures over a computer network.

In various embodiments, the method may include simulating a distribution of consumption for the potential combination of metric values and generating the target asset mixture for the potential combination of metric values based on simulating the distribution of consumption for the potential combination of metric values.

In various embodiments, the method may include providing the plurality of metric values to a minimization function. The minimization function may output the particular mixture of available asset allocations.

In various embodiments, the plurality of metrics may include age and one or more of: gender, salary, location, savings rate, membership in a defined benefit plan, risk tolerance, target retirement income, assets, match rate, or savings balance.

In various embodiments, the method may include training a machine learning model using a plurality of metric data associated with particular metrics. The machine learning model may output the plurality of metrics as affecting the plurality of potential combinations of metric values. The method may further include accessing the machine learning model to identify the plurality of metrics.

In various embodiments, the method may include monitoring the set of available asset allocations and identifying an updated set of available asset locations based on monitoring the set of available asset allocations. The method may further include dynamically remapping the target asset mixture of the potential combination of metric values to the asset definition for each of the updated set of available asset allocations and determining an updated mixture of available asset allocations for the potential combination of metric values based at least in part on the mapping of the target asset mixture of the potential combination of metric values to the asset definition for each of the updated set of available asset allocations. The method may further include updating the comprehensive set of asset mixtures.

In various embodiments, the set of available asset allocations may include a set of target date vehicles.

In various embodiments, the set of target date vehicles may include a mutual fund or a collective investment trust.

In various embodiments, the plurality of metrics may be a subset of metrics associated with determining ideal equity ratios and the metric value may be values associated with the potential combination of metric values for each of the metrics.

In various embodiments, the plurality of metrics may include objective and subjective metrics.

In various embodiments, the method may include comparing the target asset mixture and the particular mixture of available asset allocations and determining the particular mixture of available asset allocations is within a threshold deviation from the target asset mixture based on comparing the target asset mixture and the particular mixture of available asset allocations.

In various embodiments, the set of available asset allocations may include a subset of available asset allocations selected based on the target asset mixture for the potential combination of metric values.

In various embodiments, the method may include outputting an indication of the comprehensive set of asset mixtures for presentation on a display of a user computing device.

In various embodiments, the method may include determining a user, via a user computing device, has access to a subset of metric values for each potential combination of metric values of the plurality of potential combinations of metric values and filtering metric values to identify the subset of the metric values. The subset of the metric values may include the plurality of metric values.

In various embodiments, the particular mixture of available asset allocations may be a multi-factor asset mixture. The method may further include determining a single-factor asset mixture. The single-factor asset mixture may be based on a particular metric value of the plurality of metric values. The method may further include comparing the multi-factor asset mixture and the single-factor asset mixture and determining the multi-factor asset mixture is within a threshold deviation from the single-factor asset mixture based on comparing the multi-factor asset mixture and the single-factor asset mixture.

According to various embodiments of the present disclosure, a system can include an electronic data store can store metric values for a set of users, and asset definitions for asset allocations. The metric values may correspond to a plurality of metrics associated with determining equity ratios for the set of users. The system can further include a hardware processor in communication with the electronic data store. The hardware processor may execute specific computer-executable instructions to at least access from the electronic data store a metric value associated with a user from the set of users. The metric value may correspond to a metric from the plurality of metrics. Further, the hardware processor may execute specific computer-executable instructions to at least determine a target asset mixture for the user based at least in part on the metric value and identify a set of available asset allocations. Further, the hardware processor may execute specific computer-executable instructions to at least obtain from the electronic data store an asset definition for each of the set of available asset allocations and map the target asset mixture of the user to the asset definition for each of the set of available asset allocations. Further, the hardware processor may execute specific computer-executable instructions to at least determine a personalized asset mixture for the user based at least in part on the mapping of the target asset mixture of the user to the asset definition for each of the set of available asset allocations. The personalized asset mixture may include a weighted mixture of a plurality of available asset allocations selected from the set of available asset allocations to satisfy the target asset mixture for the user.

In various embodiments, the hardware processor may execute specific computer-executable instructions to at least determine a particular personalized asset mixture of each user of a plurality of users and dynamically generate a comprehensive set of asset mixtures. The comprehensive set of asset mixtures may include the particular personalized asset mixture of each user of the plurality of users.

According to various embodiments of the present disclosure, a method can be implemented by an interactive computing system configured with specific computer-executable instructions. The computing system may access a metric value associated with a user. The metric value may correspond to a metric associated with determining ideal equity ratios for users. The computing system may further determine a target asset mixture for the user based at least in part on the metric value. The computing system may further identify a set of available asset allocations including a mixture of equities and fixed income allocations. The computing system may further determine an asset definition for each of the set of available asset allocations and map the target asset mixture of the user to the asset definition for each of the set of available asset allocations. The computing system may further determine a personalized asset mixture for the user based at least in part on the mapping of the target asset mixture of the user to the asset definition for each of the set of available asset allocations. The personalized asset mixture may include a weighted mixture of a plurality of available asset allocations selected from the set of available asset allocations to satisfy the target asset mixture for the user.

In various embodiments, the set of available asset allocations may include a set of target date vehicles.

In various embodiments, the set of target date vehicles may include a mutual fund or a collective investment trust.

In various embodiments, the metric is one of a plurality of metrics associated with determining ideal equity ratios for users. Further, the computing system may access metric values associated with a user for each of the plurality of metrics.

In various embodiments, the plurality of metrics may include objective and subjective metrics.

In various embodiments, the plurality of metrics may include one or more of the following metrics: age, gender, salary, location, savings rate, membership in a defined benefit plan, risk tolerance, target retirement income, assets, match rate, or savings balance.

In various embodiments, the set of available asset allocations may include a subset of available asset allocations selected based on the target asset mixture for the user.

In various embodiments, the computing system may output an indication of the personalized asset mixture for presentation on a display.

In various embodiments, the computing system may automatically allocate investment funds based on the personalized asset mixture without user input.

In various embodiments, the computing system may rebalance an investment account of the user based on the personalized asset mixture.

In various embodiments, the set of available asset allocations may include a subset of asset allocations selected based on the target asset mixture for the user.

In various embodiments, the personalized asset mixture may include a selection of a single available asset building block that maps to the asset mixture of the user.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

FIGS. 3A-3D illustrate example use cases with respect to an example implementation of a process of distributing account assets among a fixed set of buckets or investment vehicles to optimize each account's optimal investment path or asset distribution.

DETAILED DESCRIPTION

Figure 1B:
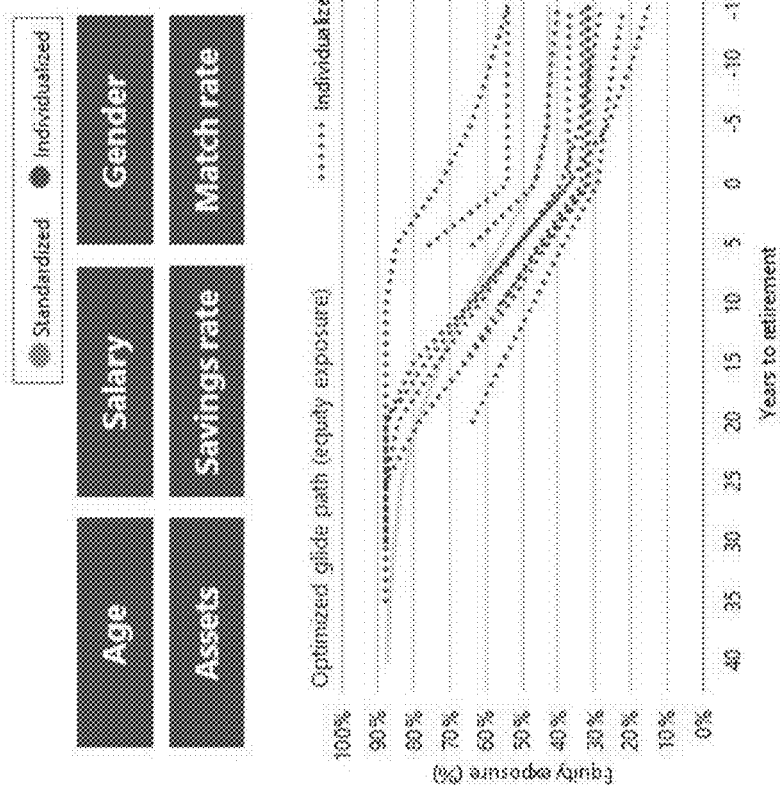
FIG. 1B illustrates a graph of asset distribution when a plurality of parameters are used to determine asset distribution.

It is often desirable to distribute or allocate a set of resources of an account (e.g., an account of a resource owner), a component (e.g., computing components or computing resources), or a computing system among a fixed set of buckets based on a set of metrics associated with the account and/or to provide information identifying the allocation of the set of resources. For example, an organization may desire to allocate different tasks to different computing resources (e.g., different computing systems, different virtual machines, different processor threads, different worker nodes, etc.) based on metrics (e.g., priority, RAM requirements, GPU requirements, bandwidth, etc.) associated with the tasks and the capabilities of the computing resources. In some cases, tasks may not be optimally performed by assigning the task to a single computing node. Instead, tasks may be more efficiently performed by breaking the task into subtasks that can be assigned to different computing nodes that can satisfy different metrics associated with particular tasks. For example, one portion of the task may be heavily reliant on bandwidth (e.g., large data transfers) and may be performed more efficiently with a computing node with relatively high bandwidth while another portion of the task (e.g., data transformations) may be performed more efficiently with a computing node that has a large number of compute cores. Thus, matching task metrics to resource capability may result in more efficient task execution.

As another example, determining asset allocations (e.g., financial assets) based on a plurality of account metrics can result in optimized investment block selection. However, in cases where a limited number of investment vehicles or blocks are available, it may be difficult to match an optimized investment path for an account to the available investment vehicles. In some such cases, a mixture of available investment vehicles may be used to more closely map to the optimal investment block selection for an account compared to using the closest matching investment vehicle that matches the available account metrics. In other words, a mixture of coarse grain investment vehicles may be used to obtain a fine-grained investment path that matches the plurality of account metrics for the account.

As noted above, one issue that may be of particular concern in asset allocation (both allocation of financial assets and computing resources) is that of determining how to allocate assets based on metrics associated with an account owner. For example, it may be desirable to obtain a fine-grained investment path that matches the plurality of account metrics for the account. Further, a user (e.g., a customer, an account manager, etc.) may wish to enable the generation of a fine-grained investment path that is based on and tuned according to the plurality of account metrics for the account. By tuning the investment path based on the plurality of account metrics for the account, the user may desire to identify an optimal investment path for the account. For example, it may be advantageous to tune an account's investment path based on the plurality of account metrics associated with the account as the tuned investment path may represent an optimized or optimal investment path based on the characteristics of a particular account. In certain asset allocation systems, an account's investment path may be based on a single account metric (e.g., the account holder's age). Therefore, while the account's investment path may be linked to the account holder's age, the investment path may not be linked to additional account metrics (e.g., salary, savings rate, etc.). Further, as the investment path may not be linked to additional user metrics, the investment path may not represent an optimal investment path (e.g., the investment path that meets particular goals of the account). In some cases, the subset of the account metrics may not be indicative of the overall account metrics and the investment path corresponding to the subset of the account metrics may be dissimilar from an investment path based on a larger set and/or a different set of the account metrics. As account metrics may change periodically (e.g., every day) and may be fine-grained, it may be advantageous to have fine-grained investment vehicles. In certain asset allocation systems, the investment vehicles may be less fine-grained (e.g., the investment vehicles may be available for every 5 years) than the account metrics (e.g., the account metrics may change every day based on age of account owner, a savings rate, etc.). Therefore, in certain asset allocation systems, the account's investment path may not be representative of an optimal investment path for the account and may provide an inadequate user experience.

Further, an account's metric values may be periodically or aperiodically modified (e.g., every week, every month, or every year). For example, a salary of an account may be modified every year. As the metric values of the account are modified, in certain asset allocation systems, the investment path may no longer be representative of the account and may become outdated. Instead, the investment path may be representative of the prior account data associated with the account and may be an incorrect investment path based on the updated account data associated with the account. Further, the modifications to the metrics values may be unpredictable or personalized modifications. For example, the modifications may include changes in savings rate, salary, or any other changes that may occur unpredictably or based on an account-specific situation. As the user is provided with a particular investment path based on the prior account data, the user may be required to request an updated investment path based on the updated account data. This may provide an inadequate and cost-prohibitive user experience as the user may be required to resubmit account data in order to identify an investment path for the account.

Further, when a user is attempting to determine asset allocations for a plurality of accounts, the user may manually identify the asset allocation for each account. Such a process may be inefficient and inaccurate as the user may be required to identify relevant metrics and metric values for each account and, based on the metric values, identify potential investment paths for each account. Therefore, the user may identify hundreds, thousands, etc. investment paths based on the metric values for the accounts. The user may then select a particular investment path for the account based on the identified investment paths. Further, the user may be required to compare the investment paths in order to identify an optimal investment path for the account. However, identifying the investment paths and comparing the investments paths in order to identify a particular investment path may be a time-consuming and resource intensive process. Further, such a process may provide an unsatisfactory experience for certain users as the users may be associated with (e.g., account managers for) multiple accounts and identifying an investment path for one account may be time consuming, let alone identifying investment paths for multiple accounts.

Further, in some embodiments, a user may utilize a manual system to determine the investment paths for a particular account. However, the investment paths may not directly correspond to a set of available asset allocations. For example, the investment path may represent an optimal investment path for the account, however, the building blocks to achieve the optimal (e.g., a fine-grained) investment path may be coarse building blocks. For example, the coarse building blocks may be target date vehicles (e.g., target date funds, target date investment fund, target date trusts, dynamic-risk funds, etc.) that are limited in applicability. Therefore, a user may not be able to utilize the course building blocks to build the investment paths. Therefore, while a user may manually identify one or more investment paths for a particular account, the investment paths may not directly correspond to a set of available asset allocations that the user or an account holder can implement.

Some aspects of this disclosure address the problems noted above, among others, by enabling an asset mixture generation system of the asset allocation system to dynamically map the target asset mixture of a particular set of metric values to asset definitions for a set of available asset allocations. In order to dynamically map the target asset mixture to asset definitions for available asset allocations, the asset mixture generation system can identify a particular set of available asset allocations from a plurality of available asset allocations that match or are similar to the investment path of the target asset mixture. Based on this identification, the asset mixture generation system can dynamically map (e.g., link) the set of available asset allocations to the target asset mixture. The asset mixture generation system can identify potential combinations of metric values. The asset mixture generation system may utilize the potential combinations of metric values in order to determine investment paths for each combination of metric values and generate a comprehensive set of asset mixtures (e.g., investment paths).

Further, a user may be able to specify the metrics for the asset allocation for a comprehensive set of asset mixtures. For example, the user may be able to specify that age, savings rate, and gender are to be considered in generating the comprehensive set of asset mixtures. Further, a user may be able to determine a particular set of metrics for the comprehensive set of asset mixtures. Therefore, the asset mixture generation system may identify particular metrics for the generation of the comprehensive set of asset mixtures.

Further, the asset mixture generation system can determine investment paths for each particular combination of metric values using a plurality of metric values. The asset mixture generation system may identify a plurality of potential combinations of metric values based on the plurality of metric values. The asset mixture generation system may determine a particular investment path (e.g., an optimized investment path) for each combination of metric values based on the plurality of metric values associated with the combination of metric values. The asset mixture generation system may determine or generate the particular investment path based on potential asset allocations (potential building blocks) for the particular investment path.

The asset mixture generation system can identify a set of available asset allocations (e.g., available building blocks) for the particular investment path. The asset mixture generation system can dynamically map the particular investment path to the available asset allocations to determine how to build the investment path. Based at least in part on the mapping of the particular investment path to the available asset allocations, the asset mixture generation system can determine a particular mixture of available asset allocations (e.g., a personalized mixture of target date vehicles) for the combination of metric values. The particular mixture of available asset allocations for the combination of metric values may represent a mixture of available assets to achieve the particular investment path or to achieve an investment path with an asset allocation within a particular threshold of the determined asset allocation for the particular investment path.

The asset mixture generation system may generate particular mixtures of available asset allocations for each combination of metric values of a plurality of combinations of metric values. For example, the asset mixture generation system may generate particular mixtures of available asset allocations for each potential combination of metric values. Therefore, the asset mixture generation system may generate a comprehensive set of asset mixtures (e.g., a set of personalized asset mixtures) that includes a particular mixture of available asset allocations for each combination of metric values. The asset mixture generation system may provide access to the comprehensive set of asset mixtures to enable a user (e.g., via a user computing device) to determine a personalized asset mixture for an account (e.g., an account associated with a particular combination of metric values). Therefore, as the account data for each account is updated or modified, the user may parse the comprehensive set of asset mixtures to identify a particular investment path for the account.

In light of the description above, it will be understood that certain embodiments disclosed herein enable an asset mixture generation system to generate a more fine-grained comprehensive set of asset mixtures compared to certain existing systems. Specifically, certain embodiments disclosed herein enable a system to generate a comprehensive set of asset mixtures that includes a particular mixture of available asset allocations for each potential combination of metric values. The ability to generate such a comprehensive set of asset mixtures enables the system to identify a personalized asset mixture for any user (as defined by a particular combination of metric values). Therefore, certain embodiments disclosed herein provide a user with a comprehensive set of asset mixtures such that the user need not calculate the personalized asset mixtures in response to particular requests, a resource intensive and time consuming process, instead, the user can utilize the comprehensive set of asset mixtures to identify the particular personalized asset mixture that satisfies the metric values for the particular account.

As explained above, distributing resources among a fixed set of buckets may be applied in different contexts. To simplify discussion and not to limit the present disclosure, the following discussion revolves around determining an optimal target date vehicle. However, the present disclosure can be used with other investment vehicles and/or in other contexts, such as computing resource allocation or computing task distribution.

Figure 1A:
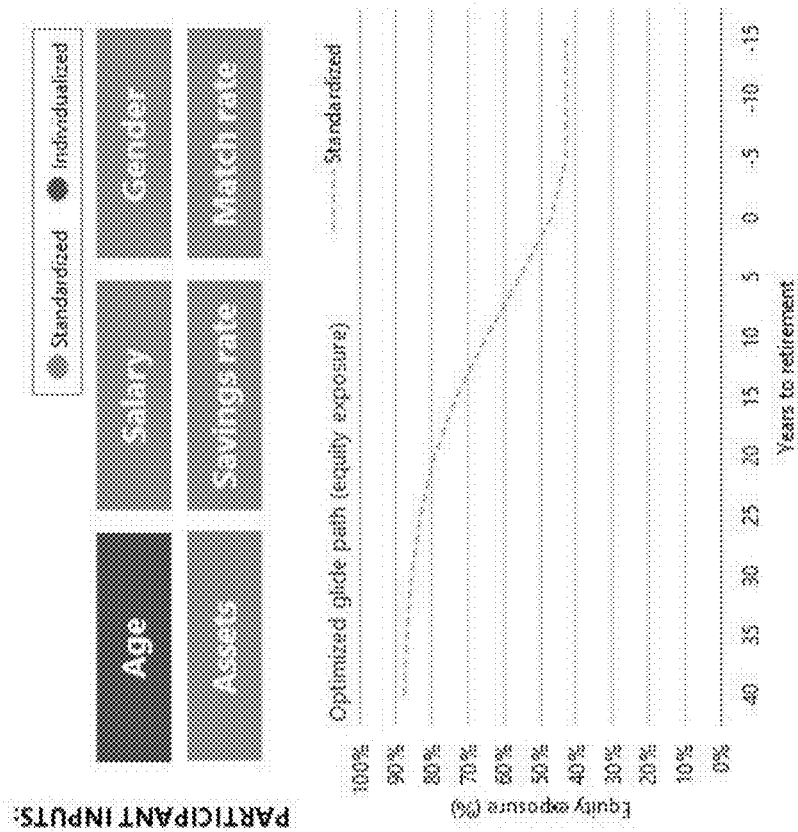
FIG. 1A illustrates a graph of asset distribution when a single parameter is used to determine asset distribution.

FIG. 1A illustrates a graph of asset distribution when a single parameter or metric (e.g., age) is used to determine asset distribution. As illustrated by the dotted line, the equity exposure for a user may vary based on age. Thus, as the variable (e.g., age) is modified, the equity exposure may change. Other variables, such as salary, gender, assets, savings rate, match rate, etc. may be ignored when determining asset exposure. As illustrated by the solid lines, if factors besides or in addition to age were considered, desired or optimal equity exposure might not match an equity exposure selected based on a user's age. Typically, when a user invests in a target date vehicle, variables besides age are ignored similar to what is illustrated in FIG. 1A. A target date vehicle may include a fund or investment vehicle (e.g., a mutual fund or a collective investment trust) that invests in particular investment assets based on an anticipated age of retirement as determined based on a user's age. For example, a user who in the year 2020 plans to retire in 25 years may invest assets in a 2045 target date vehicle.

FIG. 1B illustrates a graph of asset distribution when a plurality of parameters are used to determine asset distribution. As illustrated by the dotted lines, numerous different equity exposures may be available or recommended to a user based on the plurality of parameters. Thus, unlike the example illustrated in FIG. 1A, a user of a particular age may be presented with different investment options that are personalized to the user based on different parameters. In other words, while FIG. 1A illustrates a one size fits all option for users of a particular age, FIG. 1B illustrated individualized target date vehicle options for users of the particular age. Further, users of the same age may be presented with different target date vehicle options despite the target date vehicles being associated with age. For example, users who are 40 years old in the year 2020 may be presented with different target date vehicle options based on factors besides their age. One user may be presented with a 2045 target date vehicle, but another user of the same age (e.g., 40) may be presented with different target date vehicle vintages (e.g., a 2040, 2035, or 2050 target date vehicle) based on factors such as savings rate, salary, assets, etc. The different target date vehicles may be presented based on expected retirement age, or regardless of expected retirement age.

Embodiments of the present disclosure provide a system and method of determining a particular bucket (e.g., a target date vehicle or computing task) to allocate resources (e.g., investment assets or computing resources). In some cases, the desired resource allocation for a user may be an allocation that is not satisfied by the available buckets (e.g., target date vehicles) due to the granularities of the buckets differing (e.g., being coarser) than the determination of the optimal resource distribution of the available resources (e.g., investment funds). In other words, in some cases, it may be determined that a user's investment assets should be invested in a particular equity percentage that is not found in the available target date vehicles. This may occur regardless of whether a single or a plurality of parameters are used to determine optimal equity exposure for the user. For example, it may be determined that based on a plurality of parameter (or metric) values associated with a user that the optimal equity exposure for the user is 70%. However, there may not exist a target date vehicle with a 70% equity exposure. In such cases, a user's available assets may be distributed across multiple target data funds to obtain the 70% equity exposure (e.g., half in a 60% equity target date vehicle and half in an 80% equity target date vehicle). Embodiments disclosed herein are capable of distributing resources among a combination of particular buckets at a rate that enables an individualized target to be satisfied regardless of the existence of an existing bucket (e.g., target date vehicle) that satisfies the individualized target.

Figure 2:
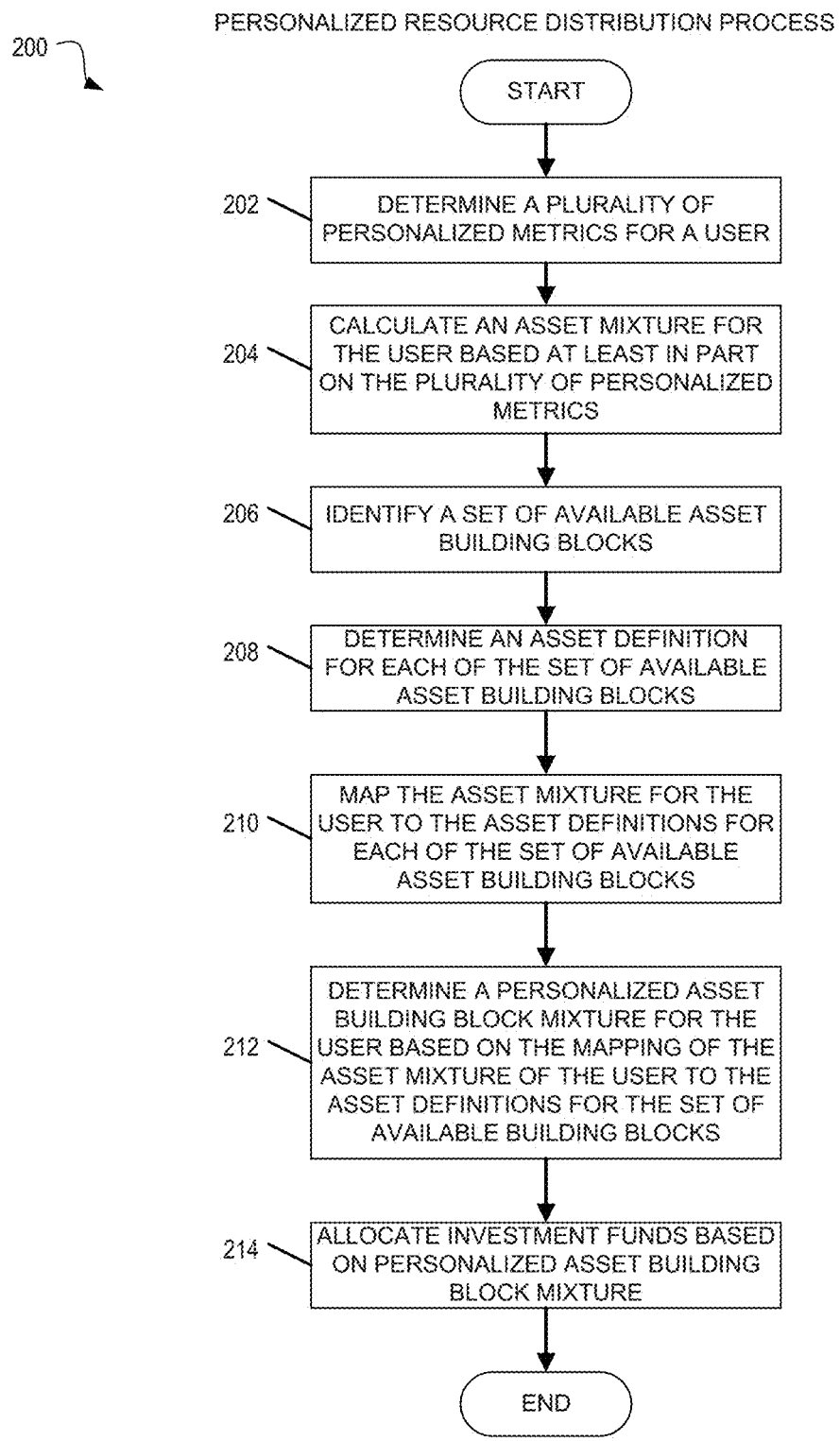
FIG. 2 presents a flowchart of one non-limiting example embodiment of a personalized resource distribution process in accordance with certain embodiments of the present disclosure.

FIG. 2 presents a flowchart of one non-limiting example embodiment of a personalized resource distribution process 200 in accordance with certain embodiments of the present disclosure. The process 200 can be implemented by an asset mixture generation system implemented in computer hardware and configured to access one or more repositories configured to store personalized user data associated with a set of metrics or parameters. The metrics may include any type of data that can be used to determine optimal asset distribution for a user. In some cases, the metrics include only objective factors. In other cases, the metrics may include both objective and subjective factors. Some examples of objective factors may include age, gender, salary, savings rate, location, membership in a defined benefit plan, employer match rate, cash assets, non-cash assets, and the like. Some examples of subjective factors may include a user's risk tolerance, the user's personal investment perspective (e.g., based on perceived value of portfolio companies or moral preferences), perceived market directions, perceived political influence on markets, etc.

The process 200 may begin with the asset mixture generation system determining a plurality of personalized metric values for a user at block 202. The personalized metric values may include user specific data for the user that corresponds to a plurality of metrics or parameters used to determine a recommended investment path or plan for the user. The metrics may include any type of objective and/or subjective metrics including demographic and financial metrics. For example, the metrics may include gender, age, salary, savings rate, risk tolerance, employer match rate, and any other of the aforementioned object or subjective factors. The personalized metric values for the user may be obtained from a repository that stores user data. The repository may be accessed by the asset mixture generation system to obtain the plurality of personalized metric values.

Further, the metrics may include at least one metric corresponding to a categorization or defining fund characteristic of available asset building blocks. For example, if the asset building blocks are target date vehicles, the asset building blocks may be associated with a date corresponding to an anticipated age of retirement. This age of retirement may be a national retirement age or an average age of retirement of users that purchase the asset building block. In some cases, the metric used to characterize the fund or asset building block may be of a different granularity than values that may be associated with a corresponding metric for the user. For example, the granularity of a user's age may be a single year (e.g., the user may be 35, 36, or 37, etc.). However, the granularity of a target date vehicle may be on an order of 5 years (e.g., a 2025, 2030, 2035 target date vehicle, etc.). The age associated with the target data vehicle may sometimes be referred to as its vintage. For example, target date vehicle vintage 1 may be the TDF 2025, and target date vehicle vintage 2 may be the TDF 2030, etc.

At block 204 the asset mixture generation system calculates an asset mixture for the user based at least in part on the plurality of personalized metric values. This asset mixture for the user may be referred to as a target asset mixture as it represents a goal or target recommended for the user based on the personalized metric values. In some cases, the asset mixture may be determined based on a single personalized metric value. The asset mixture may indicate the amount of user assets (e.g., investment funds) invested in equity or in company stock versus cash reserves, bonds, or other investment options. In some cases, the asset mixture may be determined using any type of asset mixture determination process that determines recommended equity mixtures or asset mixtures for a user. For example, the asset mixture may be determined using one or more of the embodiments described in the June 2017 publication "The PIMCO Glide Path Construction Process" by Moore et al., which is attached as Appendix A, and which is hereby incorporated by reference in its entirety for all purposes.

At block 206, the asset mixture generation system identifies a set of available asset building blocks. The asset building blocks may include any type of investment fund. In some cases, the asset building blocks may be associated with different equity percentages. Moreover, in some cases, the asset building blocks may be target date vehicles that are configured to modify a percentage of equity (or higher risk higher growth based assets, such as equities) in the fund versus other assets (e.g., lower risk lower growth based assets, such as government and/or index-linked bonds) as time approaches the target date associated with the target date vehicle. For example, the target date vehicles may have a relatively high percentage of equity and low percentage of bonds when the target date is far off, and as the target date comes closer, the asset mixture may change to have a lesser percentage of equity and a greater percentage of bonds. The change in asset mixture over time may be referred to as the "glidepath" and generally indicates the how an investment strategy becomes increasingly conservative over time. FIG. 1B illustrates personalized glide paths for different users based on different personalized metric values. In contrast, FIG. 1A illustrates a single glidepath for all users of a particular age or a particular amount of time until retirement, regardless of other metrics. Generally, the asset building blocks may be defined or categorized by a single metric (e.g., date or age) that correlates to the asset mixture within the asset building blocks. However, in some cases, the asset building blocks may be associated with multiple metrics (e.g., date and sector, or date and perceived moral values of the included equities, such as no companies that sell tobacco).

At block 208, the asset mixture generation system determines an asset definition for each of the set of available asset building blocks. Determining the asset definition may include determining the percentage of equities included in each of the set of available asset building blocks. Further, the asset mixture generation system may determine the asset definition by accessing a repository of asset definitions that specify the constituent components of each asset building block.

At block 210, the asset mixture generation system maps the asset mixture for the user to the asset definitions for each of the set of available asset building blocks. Mapping the asset mixture may include determining the asset building block from the set of available asset building blocks that includes the asset mixture that is determined at the block 204 to satisfy the personalized metrics of the user. In other words, in some cases, the block 210 may include determining a target date vehicle that includes a percentage of equities that maps to the determined percentage of equities that is optimal for the user based on the plurality of personalized metric values determined for the user. In some cases, there may not be an asset building block (e.g., target date vehicle) with an equity mixture that satisfies the determined asset mixture target for the user determined at the block 204. In some such cases, the closest asset building block may be selected (e.g., using a rounding process). However, in other cases, as described with respect to the block 212, a mixture of asset building blocks may be used to satisfy the determined asset mixture target for the user.

At block 212, the asset mixture generation system determines a personalized asset building block mixture for the user based on the mapping of the asset mixture of the user to the asset definition for the set of available building blocks. In some cases, the personalized asset building block mixture may be a mixture of one. In other words, a single investment fund may be selected for a user. The selection of a single asset building block may occur when there exists an asset building block (e.g., target date vehicle) that includes an asset mixture that matches the determination of the asset mixture for the user determined at the block 204.

In other cases, the personalized asset building block mixture may be a combination of asset building blocks used to obtain the asset mixture determined at the block 204 for the user. For example, if the optimal equity mixture for the user is determined to be 57%, it may be determined that $7/10$ of a user's assets should be invested in an asset building block (e.g., target date vehicle) that has a 60% equity exposure and $3/10$ should be invested in an asset building block with a 50% equity exposure. In some cases, the personalized asset building block mixture may comprise a weighted mixture of more than two asset building blocks based on the asset mixture determined at the block 204 and the asset definitions determined at the block 208.

At block 214, the asset mixture generation system allocates investment funds based on the personalized asset building block mixture for the user. The asset mixture generation system may be configured to automatically allocate investment funds among the asset allocations included in the personalized asset building block mixture. Alternatively, or in addition, the asset mixture generation system may output an indication of the recommended asset building block mixture for the user that satisfies the asset mixture determined at the block 204. The indication may be output on a display of the asset mixture generation system or it may be transmitted to a computing system of a user enabling the computing system to display the indication of the recommended asset building block mixture of personalized asset mixture to the user. In some cases, the process 200 may be performed once, periodically, on a scheduled basis, when requested, or at any other time. In some cases, the process 200 may result in the rebalancing of an investment account of the user based on the personalized asset mixture, or an update to the personalized asset mixture determined from performing the process 200.

In some embodiments, a user can modify the personalized metric values to determine how the modification to the values may change a recommended asset mixture and consequently, a recommended personalized asset building block mixture for the user.

Figures 3A, 3B:
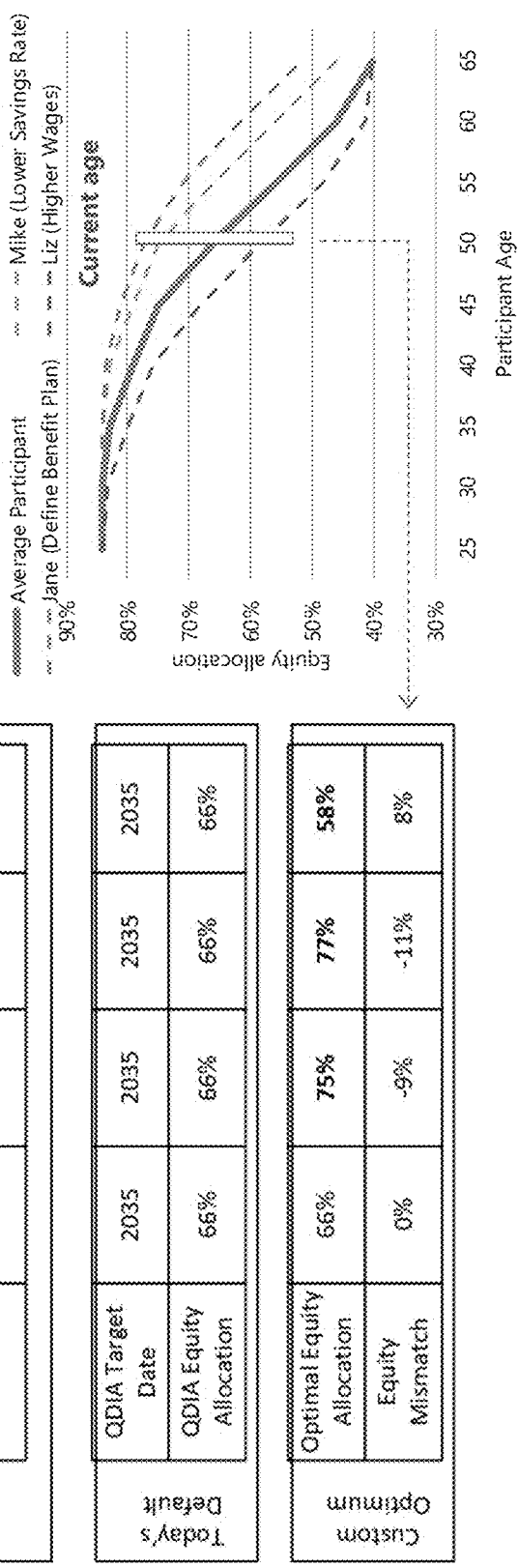

FIGS. 3A-3D illustrate example use cases with respect to an example implementation of a process of distributing user assets among a fixed set of buckets or investment vehicles to optimize each user's optimal investment path or asset distribution. As illustrated in FIG. 3A, a system, such as the asset mixture generation system, may determine individualized participant data at step 1. In other words, the asset mixture generation system obtains personalized metric values for a set of metrics or parameters. The example of FIG. 3A includes three different example use cases: Mike, Jane, and Liz. Further, FIG. 3A provides the market average for reference. Each of the users is of the same age. Thus, using traditional investment systems, each of the users would be recommended to have the same percentage of equity and accordingly, to invest in the same target date vehicle. This is illustrated by the 2035 qualified default investment alternative ("QDIA") target date (e.g., target date vehicle) listing for each of the users with a QDIA equity allocation of 66%.

However, as illustrated, Liz has a higher income than the other users and the market average. Further, Mike has a lower savings rate than both the market average and the other users. Moreover, Jane has access to a defined benefit plan, while Mike and Liz do not. Thus, using embodiments disclosed herein, the optimal equity allocation may differ between the three users despite the users having an age that matches each other and the market average. For instance, using a multivariate analysis, it may be determined that the optimal equity allocations for Mike, Jane, and Liz are 75%, 77%, and 58%, respectively.

At step 2, as illustrated in FIG. 3B, the system may generate optimal allocations of equity for the users. The optimal allocations may be determined by generating different glidepaths based on different metrics associated with the users. The age for each user may then be used to determine the optimal equity distribution for the glide path associated with the user. For example, one glidepath may be generated based on a metric associated with a lower than average savings rate (e.g., for users like Mike), another glidepath may be generated based on a metric associated with higher wages (e.g., for users like Liz), and another glidepath may be generated for users with a defined benefit plan (e.g., for users like Jane). Although only three (excluding the market average) glidepaths are illustrated, it should be understood that there may be hundreds, thousands, or more glidepaths. Each glidepath may be associated with different equity levels at different ages.

Each glidepath may be considered a different potential asset building block definition. However, generating and maintaining funds for each glidepath is not possible or practical. As illustrated by the line identifying the current age for the example set of users, each user of the same age may ideally have a different percentage of equity within their investment. Using the single asset building block (e.g., the target date vehicle 2030) results in no user having the ideal mixture of assets.

As illustrated in FIG. 3C, using a mixture of asset building blocks enables the system to more accurately satisfy the optimal asset mixture for each of the users. As illustrated in FIG. 3C, a user that matches the market average would have a 66% equity allocation for an age 50 person, which aligns with a target date vehicle of 2035. Thus, 100% of an average user's investment would be allocated to the target date 2035 fund. For some users (e.g., Mike) the user's investment may be allocated to a different target date vehicle (e.g., target date 2040) to satisfy the optimal equity percentage for the user. For other users (e.g., Jane and Liz), the user's investment may be allocated across a plurality of target date vehicles in an attempt to satisfy the optimal equity percentage for the user. The plurality of target date vehicles may include the target date vehicle designated for the user's age (e.g., Liz's age) and one or more additional target date vehicles that in combination provide the recommended equity rate for the user. In some cases, the plurality of target date vehicles may omit the target date vehicle designated for the user's age (e.g., Jane's age).

As illustrated in FIG. 3D, the system may identify a plurality of potential metrics. For example, the system may identify an age metric, a gender metric, an income metric, a plan assets metric, and a total contribution metric. Further, the system may identify potential metric values for each metric. For example, the age metric may include potential metric values (e.g., 50 metric values) of less than 25, greater than 75, and each year between 25 and 75, the gender metric may include potential metric values (e.g., 2 metric values) of male or female, the income metric may include potential metric values (e.g., 30 metric values) of less than 20 k, greater than 500 k, and various income metric values between 20 k and 500 k, the plan assets metric may include potential metric values (e.g., 30 metric values) of less than 20 k, greater than 2000 k, and various income metric values between 20 k and 2000 k, and the total contribution metric may include metric values (e.g., 25 metric values) of less than 1 percent, greater than 40 percent, and various percentages between 1 percent and 40 percent. It should be understood that the depicted values are non-limiting example, and other values or ranges may exist for the illustrated metrics. Further, other metrics may be used in place of or in addition to the illustrated metrics. The system may identify a particular subset of metrics (e.g., based on a machine learning model output). For example, the system may identify the metric, the income metric, and the total contribution metric as the predictive metrics to generate a comprehensive set of asset mixtures. Based on the identified metrics and the potential metric values for the metrics, the system may generate the comprehensive set of asset mixtures that includes an asset mixture for each potential combination of metric values of the metrics.

Figure 4:
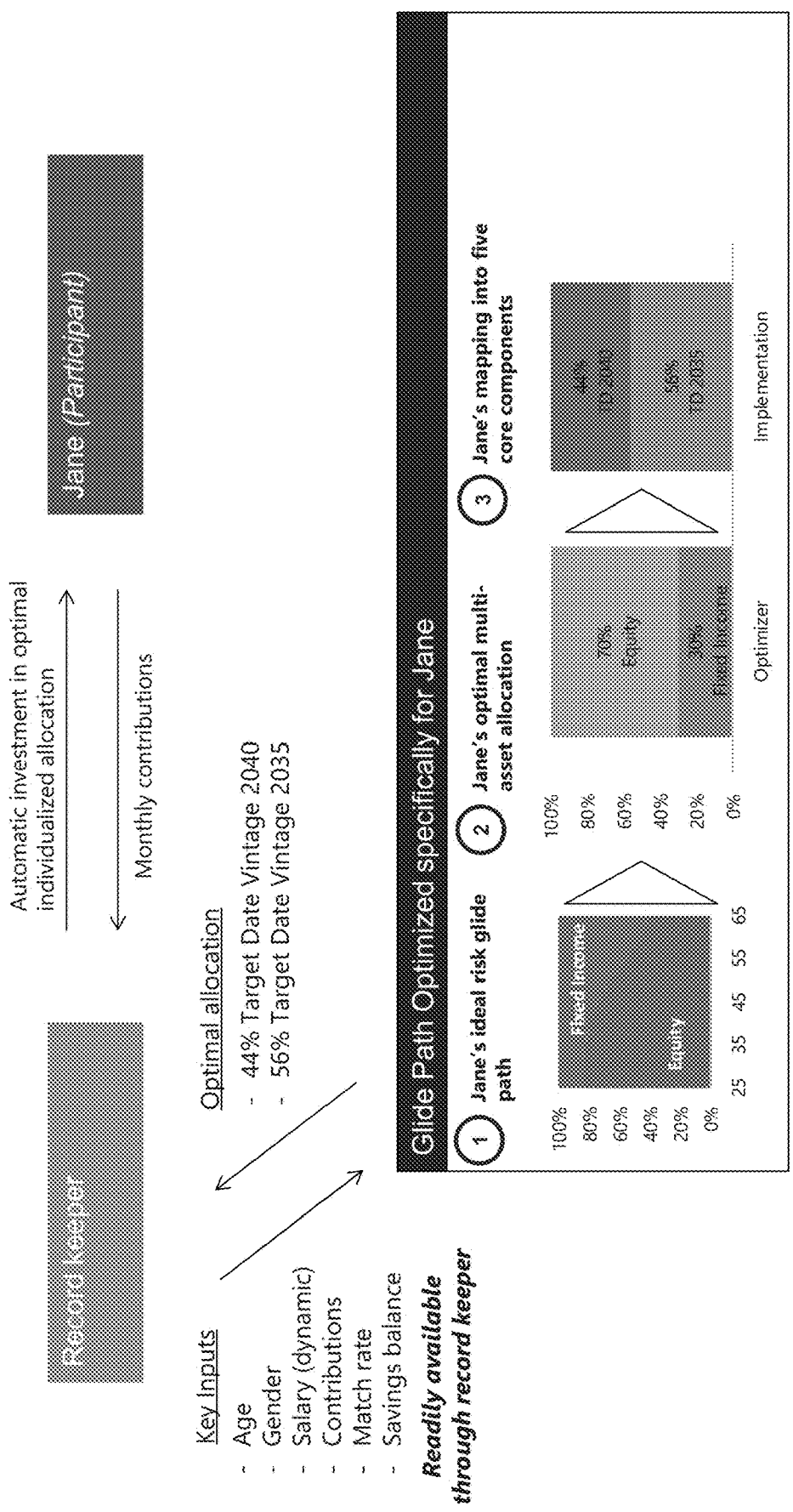
FIG. 4 illustrates an example operation of an asset mixture generation system in accordance with certain embodiments of the present disclosure.

FIG. 4 illustrates an example operation of an asset mixture generation system in accordance with certain embodiments of the present disclosure. The example operation is performed with respect to an example account (e.g., the account of Jane) from FIGS. 3A-3C. The asset mixture generation system may provide the comprehensive set of asset mixtures to a user, via a user computing device, (e.g., the record keeper) may receive a comprehensive set of asset mixtures from the asset mixture generation system. Jane, via the account, may provide the user with an indication of monthly contributions for investment. This monthly contribution may be as part of a defined benefit plan or otherwise.

The user computing device may access a number of input values associated with a number of parameters (e.g., age, gender, salary, contributions, match rate, savings balance, etc.). Generally, the parameters may include any metrics that affect or have been demonstrated to affect the optimal equity rate for a user to achieve an investment goal (e.g., retirement savings target).

The user computing device may determine an optimal glide path for the user based on the set of input values. The glide path may indicate a ratio of equity percentage to fixed income for different ages. However, unlike traditional models, the glide path may vary or be shifted based on one or more additional factors in addition to age (e.g., gender or salary, etc.).

The user computing device may then determine Jane's optimal multi-asset allocation based on the ideal risk glide path for Jane to determine her equity and fixed income mix that is most likely to accomplish her retirement goals by accessing the comprehensive set of asset mixtures provided by the asset mixture generation system. In the non-limiting example of FIG. 4, the ideal equity to fixed income ratio may be 70% to 30%. A target date vehicle may not exist that includes 70% equity. However, the user can determine a mixture of the available target date vehicles to accomplish the determined ratio of equity to fixed income. For example, the desired equity to fixed income ratio may be achieved by the following mixture of target date vehicles: 44% target date 2040 and 56% target date 2035.

Figure 5:
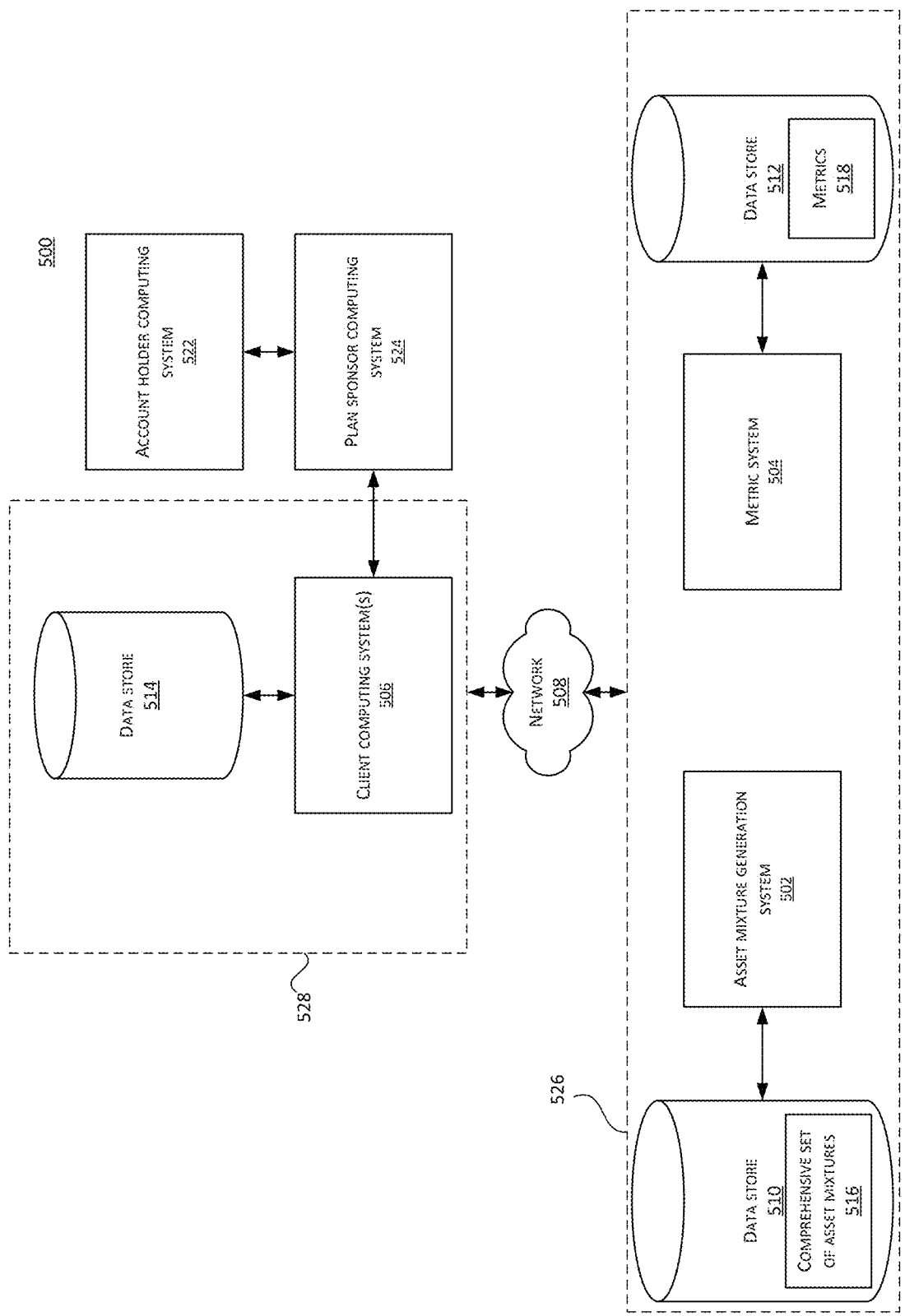
FIG. 5 depicts a schematic diagram of an example networked environment according to some embodiments.

FIG. 5 illustrates an example environment 500 in which an asset mixture generation system 502 is implemented according to some embodiments, enabling the generation of a comprehensive set of asset mixtures 516 (e.g., a product database). The example environment 500 includes an asset mixture generation system 502, a metric system 504, one or more client computing systems 506, a plan sponsor computing device 524, and an account holder computing device 522 that are each connected and/or communicating over a network 508. In some embodiments, more or less systems are included in the example environment 500. For example, the example environment 500 may include multiple metric systems 504. Further, one or more of the asset mixture generation system 502, the metric system 504, and the client computing system 506 may be the same system. For example, the asset mixture generation system 502 may perform multiple functions such as identification of the metrics 518 of the metric system 504 and generation of the comprehensive set of asset mixtures 516 of the asset mixture generation system 502. In some embodiments, the client computing system 506 and the data store 514 may be part of an asset portfolio management system 528 and/or one or more of the asset mixture generation system 502, the metric system 504, the data store 510, and/or the data store 512 may be part of an asset provider system 526 (e.g., an asset balancing system). The asset provider system 526 may generate the comprehensive set of asset mixtures (e.g., a table of different asset mixtures associated with different metric values). Further, the asset portfolio management system 528 may obtain the comprehensive set of asset mixtures and balance accounts based on the comprehensive set of asset mixtures and metric values associated with the accounts. The asset mixture generation system 502, the metric system 504, and the client computing system 506 refer to computing devices or systems that compute, assemble, store, correlate, or otherwise process information. The asset mixture generation system 502, the metric system 504, and/or the client computing system 506 can include, but are not limited to, a personal computer, a server computer, a laptop device, a multiprocessor system, a microprocessor based system, a network PC, a minicomputer, a mainframe computer, or a distributed computing environment that includes any of the above systems or the like.

Each of the asset mixture generation system 502, the metric system 504, and the client computing system 506 includes, is connected to, or is in communication with a respective data store 510, 512, and 514. Each data store 510, 512, and 514 maintains and/or may access data associated with the comprehensive set of asset mixtures 516. For example, data store 510 stores the comprehensive set of asset mixtures 516 for provision to the client computing system 506. The comprehensive set of asset mixtures 516 may identify an ideal equity and fixed income mix for each combination of metric values. Further, data store 512 stores metrics 518 for the generation of the comprehensive set of asset mixtures 516. The metrics 518 may include a set of metrics that are identified as predictive (e.g., predictive for one or more accounts). Further, data store 514 can receive and store the comprehensive set of asset mixtures 516. In some embodiments, the client computing system 506 may receive the comprehensive set of asset mixtures 516 (e.g., in real-time or not in real-time) from the asset mixture generation system 502 and store the comprehensive set of asset mixtures 516 in the data store 514. For example, the asset mixture generation system 502 may provide, in real-time, the comprehensive set of asset mixtures 516 via the network 508 to the client computing system 506. In other embodiments, based upon generation of the comprehensive set of asset mixtures 516, the asset mixture generation system 502 may provide the comprehensive set of asset mixtures 516 to the client computing system 506 for storage in the data store 514. Further, the client computing system 506 may request the comprehensive set of asset mixtures 516 from the asset mixture generation system 502 and/or the data store 510. In some embodiments, each of the asset mixture generation system 502, the metric system 504, and the client computing system 506 communicates with a respective data store 510, 512, and 514 through the network 508.

Elements of the example environment 500 including one or more of the asset mixture generation system 502, the metric system 504, and the client computing system 506 or the data stores 510, 512, and 514 can be implemented at a network computing service or cloud provider network (sometimes referred to simply as a "cloud"). The cloud provider network may include a pool of network-accessible computing resources (such as compute, storage, and networking resources, applications, and services), which may be virtualized or bare-metal. The cloud can provide on-demand network access to a shared pool of configurable computing resources that can be programmatically provisioned and released in response to commands. These resources can be dynamically provisioned and reconfigured to adjust to variable load.

The network 508 can include the Internet, an intranet network, a cellular communication network, a wide area network ("WAN"), a local area network ("LAN"), a personal area network ("PAN"), a wireless local area network ("WLAN"), or other networks. In some implementations, each of the asset mixture generation system 502, the metric system 504, and the client computing system 506 communicates with a subset of the asset mixture generation system 502, the metric system 504, and the client computing system 506. For example, the metric system 504 may communicate with the asset mixture generation system 502 and the client computing system 506 may communicate with the asset mixture generation system 502.

The asset mixture generation system 502 may obtain metrics 518 from the metric system 504. The metric system 504 may identify metrics for the generation of the comprehensive set of asset mixtures 516. As discussed above, the metrics system 504 and the asset mixture generation system 502 may be part of an asset provider system 526. In some embodiments, the metric system 504 may be separate from the asset mixture generation system 502. Further, the metric system 502 may include a machine learning model that identifies particular metrics (e.g., age, salary, savings rate, etc.) for the generation of a comprehensive set of asset mixtures for a particular set of accounts. For example, based on a particular input (e.g., a set of accounts), the machine learning model may be trained to identify metrics that are predictive of the optimal investment path for the set of accounts. The asset mixture generation system 502 may automatically access the metrics in response to a request to generate the comprehensive set of asset mixtures 516. In some cases, a user (e.g., a data owner) may identify the metrics for the asset mixture generation system 502. Based on obtaining the metrics, the asset mixture generation system 502 may identify relevant metrics for the generation of the target asset mixtures.

The asset mixture generation system 502 may identify, based on the obtained metrics 518, metric values for each of the metrics 518. The asset mixture generation system 502 may identify each unique combination of metric values for the metrics 518. Further, the asset mixture generation system 502 may identify potential metric values in order to identify a plurality of potential combinations of metric values. For a salary metric, the asset mixture generation system 502 may identify salary metric values based on a particular window between various salary metric values. For example, the asset mixture generation system 502 may identify potential salary metric values as salary metric values between $50,000 and $100,000 as separated by every $1,000.

Based on identifying the metric values for each of the metrics, the asset mixture generation system 502 may identify a target asset mixture for each combination of metric values. The target asset mixture may represent an optimal asset mixture for each combination of metric values. In some embodiment, the asset mixture generation system 502 may include one or more machine learning models (e.g., neural networks) to identify the target asset mixture for each combination of metric values. The target asset mixture may represent an optimal asset mixture based on one or more synthetic asset allocations.

In order to identify a particular mixture of available asset allocations based on the target asset mixture, the asset mixture generation system 502 may identify a set of available asset allocations and an asset definition for each of the available asset allocations. Further, the asset mixture generation system 502 may map the synthetic asset allocations to the available asset allocations based on the asset definition for each of the available asset allocations. By mapping the synthetic asset allocations to the available asset allocations, the asset mixture generation system 502 may generate a plurality of asset mixtures (e.g., investment paths, glidepaths, etc.). For example, the asset mixture generation system 502 may generate a matrix of asset mixtures. The asset mixture generation system 502 may use Equation 1, as seen below, to generate the matrix of asset mixtures.

$$F_i^O = m \times S_i^O \qquad \text{Equation 1}$$

In Equation 1, $F_i^O$ may be a matrix of asset mixtures, $S_i^O$ may be the target asset mixture based on a particular combination of metric values, and m may be a mapping matrix to map synthetic asset allocations to available asset allocations.

Based on the matrix of asset mixtures, the asset mixture generation system 502 may identify a particular asset mixture of available asset allocations from the matrix of asset mixtures. The asset mixture generation system 502 may use Equation 2, as seen below, to identify the particular mixture of available asset allocations.

$$\min_W (F_{RPB,j} \times w - F_{i,j}^O)'\Sigma(F_{RPB} \times w - F_{i,j}^O) - \lambda \times v'w \qquad \text{Equation 2}$$

In Equation 2, $\min_W$ may be a minimization function, $F_{RPB,j}$ may be a matrix of available asset allocations (e.g., a 13×10 matrix of fund level glidepath allocations for available asset allocations), $F_{i,j}^O$ may be the matrix of asset mixtures, w may be a weight, λ may be a preference parameter for tail risk hedging vintages, v' may be a vector containing 1 for tail risk hedging and containing 0 otherwise, i may be a particular set of metric values, j may be a particular age metric value The output of the minimization function may be a particular mixture of available asset allocations a particular combination of metric values. The particular mixture of available asset allocations may be a mixture of assets based on the target asset mixture and may be generated using the asset definitions of the available asset allocations. Further, the asset mixture generation system 502 may generate a comprehensive set of asset mixtures 516 that include a particular mixture of available asset allocations for each combination of metric values. The comprehensive set of asset mixtures 516 may include an interactive, searchable database that enables a user to identify a particular personalized asset mixture given a set of metric values (e.g., for an account). The asset mixture generation system 502 may store the comprehensive set of asset mixtures 516 in the data store 510. Further, the asset mixture generation system 502, based on a request from the client computing system 506, may route the comprehensive set of asset mixtures to the client computing system 506 for storage in a data store 514. In some embodiments, the asset mixture generation system 502 may cause display of the comprehensive set of asset mixtures 516 at the client computing system 506.

The plan sponsor computing device 524 (e.g., a computing device associated with a plan sponsor, employer, etc.) may receive metric values associated with an account from an account holder computing device 522 (e.g., a computing device associated with an employee, a recipient of the investment plan, etc.) and may store the metric values for the particular account. The plan sponsor computing device 524 may also receive a request for an investment path from the account holder computing device 522. Based on the request, the plan sponsor computing device 524 can provide the metric values for the account to the client computing system 506 (e.g., the record keeper). In some embodiments, the account holder computing device 522 may provide metric values directly to and/or provide a request for an investment path directly to the client computing system 506. Based on the metric values for the account and the comprehensive set of asset mixtures 516, the client computing system 506 may identify a particular asset mixture for the account and provide and/or identify the asset mixture for the account. Therefore, the plan sponsor computing device 524 may communicate with the client computing system 506 in order to identify a particular investment path for a particular account (e.g., an account associated with the account holder computing device 522) based on metric values for the account identified by the account holder computing device 522. Further, the metric values provided by the account holder computing device 522 may enable the plan sponsor computing device 524 to request a particular asset mixture based on the metric values and the comprehensive set of asset mixtures 516.

Figure 6:
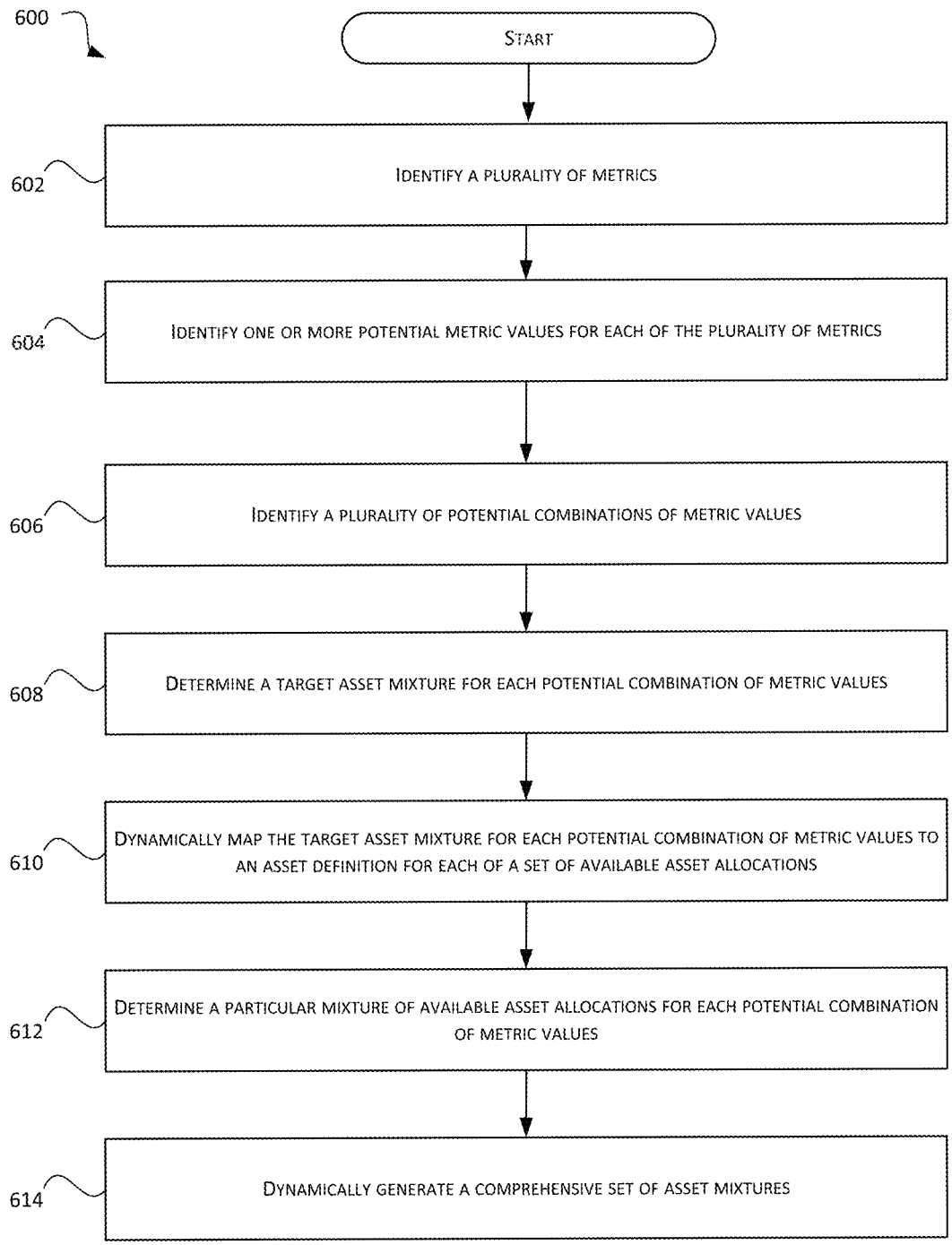
FIG. 6 presents a flowchart of an example route for generating a comprehensive set of asset mixtures.

FIG. 6 presents a flowchart of an example embodiment of a generation of a comprehensive set of asset mixtures in accordance with certain embodiments of the present disclosure. The process 600 can be implemented by an asset mixture generation system implemented in computer hardware and configured to access one or more repositories configured to store personalized user data associated with a set of metrics or parameters.

The process 600 may begin with the asset mixture generation system identifying a plurality of metrics at block 602. The asset mixture generation system may identify the metrics and/or receive the metrics from a metric system, as discussed above, based on determining that the metrics are the most predictive metrics for determining target asset mixtures. In some embodiments, the metrics may include all of the metrics. In other embodiments, the metrics may include a portion of the metrics. The plurality of metrics may include age and one or more of gender, salary, location, savings rate, membership in a defined benefit plan, risk tolerance, target retirement income, assets, match rate, or saving balance.

At block 604, the asset mixture generation system identifies one or more potential metric values for each of the plurality of metrics. The one or more potential metric values may include each potential metric value for a particular metric. Further, the one or more potential metric values may include metric values at a particular (e.g., a specified) level of granularity. Further, the one or more potential metric values for a particular may include every potential metric value at the desired granularity. For example, for a salary metric, the one or more potential salary metric values may include potential salary metric values separated by a cent, a dollar, ten dollars, one hundred dollars, one thousand dollars, etc.

In order to access the plurality of metric values, the asset mixture generation system may obtain the plurality of metrics. The machine learning model may be trained using a plurality of metric data associated with particular metrics of particular combinations of metric values and may output a plurality of metrics as determinative or predictive of the target asset mixture for a user. For example, the machine learning model may identify that certain metrics have a higher or greater impact on target asset mixtures.

In some embodiments, the asset mixture generation system may determine a customer has access to a subset of the metric values for a subset of the metrics. For example, a particular customer may have access to age, salary, and savings rate metrics but not match metrics. Based on this determination, the asset mixture generation system may filter the plurality of metric values to identify the subset of the metric values.

At block 606, the asset mixture generation system identifies a plurality of potential combinations of metric values. Each potential combination of metric values may include a different combination of metric values for the metrics. For example, the plurality potential combinations of metric values may correspond to different combinations of metric values for age, salary, and savings rate metrics. Further, a first combination may correspond to a first age metric value, a first salary metric value, and a first savings rate metric value, a second combination may correspond to the first age metric value, the first salary metric value, and a second savings rate metric value, a third combination may correspond to the first age metric value, a second salary metric value, and the savings rate metric value, etc. It will be understood that the plurality of potential combinations of metric values may correspond to more, less, or different combinations of metric values.

At block 608, the asset mixture generation system determines a target asset mixture for each potential combination of metric values. The target asset mixture may be based at least in part on a set of asset allocations. Further, the asset mixture generation system may identify a set of available asset allocations that include a mixture or combination of equities and fixed income allocations. The asset mixture generation system may determine an asset definition for each of the set of available asset allocations. In order to determine the target asset mixture for each potential combination of metric values, the asset mixture generation system may simulate a distribution of resource consumption for each potential combination of metric values and generate the target asset mixture based on the simulated distribution of resource consumption for the particular combination of metric values.

At block 610, the asset mixture generation system dynamically maps the target asset mixture for each potential combination of metric values to an asset definition for each of a set of available asset allocations. The asset mixture generation system may monitor the set of available asset allocations and identify updated available asset allocations. Based on identifying the updated available asset allocations, the asset mixture generation system may dynamically remap the target asset mixture for each potential combination of metric values.

At block 612, the asset mixture generation system determines a particular mixture of available asset allocations for each potential combination of metric values. The asset mixture generation system may determine the particular mixture of available asset allocations based on dynamically mapping the target asset mixture to an asset definition. Further, the particular mixture of available asset allocations may include a weighted mixture or combination of a plurality of available asset allocations from the set of available asset allocations to satisfy the target asset mixture of the potential combination of metric values. In order to determine the particular mixture of available asset allocations, the asset mixture generation system may provide the plurality of metric values to a minimization function that outputs the particular mixture of available asset allocations. Based on remapping the target asset mixture, the asset mixture generation system may determine an updated mixture of available asset allocations mixture.

In some embodiments, the asset mixture generation system may compare the target asset mixture and the particular mixture of available asset allocations to determine whether the particular mixture of available asset allocations is within a threshold deviation or distance from the target asset mixture based on the comparison.

In other embodiments, the particular mixture of available asset allocations may be a multi-factor asset mixture and the asset mixture generation system may determine a single-factor asset mixture based on particular metric and a particular metric value (e.g., age). The asset mixture generation system may compare the single-factor asset mixture and the asset mixture to determine whether the asset mixture is within a threshold deviation or distance from the single-factor asset mixture based on the comparison.

At block 614, the asset mixture generation system dynamically generates a comprehensive set of asset mixtures. The comprehensive set of asset mixtures may include the particular mixtures of available asset allocations of each potential combination of metric values. The asset mixture generation system may receive or obtain a request to access the comprehensive set of asset mixtures from a customer computing device. The asset mixture generation system may verify that the account associated with the customer computing device and transmit the comprehensive set of asset mixtures if the account associated with the customer computing device is verified. In some embodiments, the asset mixture generation system may cause display of the comprehensive set of asset mixtures at the customer computing device. In order to transmit the comprehensive set of asset mixtures to the customer computing device, the asset mixture generation system may route the comprehensive set of asset mixtures over a computer network.

In some embodiments, the asset mixture generation system may dynamically generate an algorithm based on the comprehensive set of asset mixtures. The algorithm may receive as input a particular combination of metric values and provide a personalized asset mixture based on the particular combination of metric values. Further, the asset mixture generation system may not provide the comprehensive set of asset mixtures to the customer computing device and may provide the algorithm based on the comprehensive set of asset mixtures.

Figure 7:
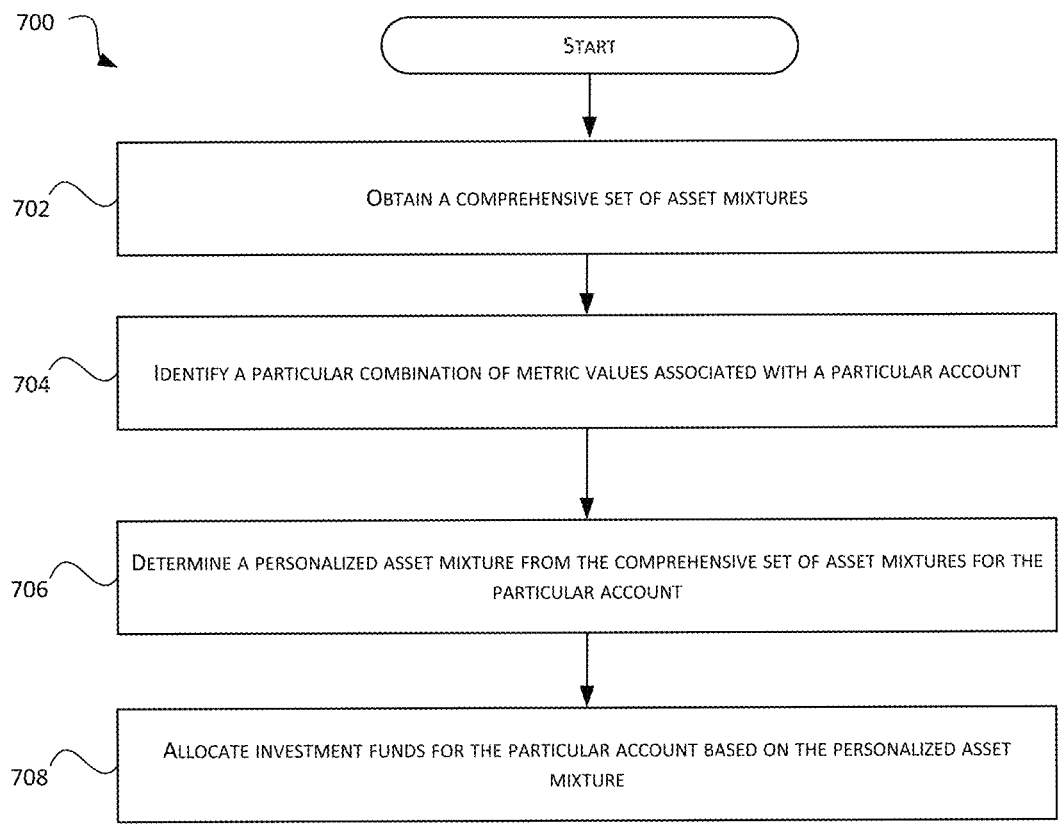
FIG. 7 presents a flowchart of an example route for obtaining a comprehensive set of asset mixtures and determining a personalized asset mixture based on the comprehensive set of asset mixtures.

FIG. 7 presents a flowchart of an example embodiment of a determination of a particular personalized asset mixture based on an obtained comprehensive set of asset mixtures in accordance with certain embodiments of the present disclosure. The process 700 can be implemented by an asset mixture generation system and/or an asset portfolio management system implemented in computer hardware.

The process 700 may begin with a computing system (e.g., the asset mixture generation system and/or the asset portfolio management system) obtaining a comprehensive set of asset mixtures at block 702. In some embodiments, the computing system may dynamically generate the comprehensive set of asset mixtures, as discussed above. In other embodiments, the computing system may obtain the comprehensive set of asset mixtures from a separate computing system.

At block 704, the computing system may identify a particular combination of metric values associated with a particular account. For example, the computing system may identify a plurality of metric values reported by an account holder computing system.

At block 706, the computing system may determine a personalized asset mixture from the comprehensive set of asset mixtures for the particular account. Further, the computing system may obtain a personalized asset mixture associated with the particular combination of metric values. In some embodiments, the computing system may provide the particular combination of metric values to an algorithm to identify the personalized asset mixture.

At block 708, the computing system may allocate investment funds for the particular account based on the personalized asset mixture. For example, the computing system may automatically allocate investment funds based on the personalized asset mixture.

Various example embodiments of the disclosure can be described by the following clauses:

Clause 1: A computer-implemented method comprising:
as implemented by an interactive computing system configured with specific computer-executable instructions,
accessing a metric value associated with a user, the metric value corresponding to a metric associated with determining ideal equity ratios for users;
determining a target asset mixture for the user based at least in part on the metric value;
identifying a set of available asset allocations comprising a mixture of equities and fixed income allocations;
determining an asset definition for each of the set of available asset allocations;
mapping the target asset mixture of the user to the asset definition for each of the set of available asset allocations; and
determining a personalized asset mixture for the user based at least in part on the mapping of the target asset mixture of the user to the asset definition for each of the set of available asset allocations, wherein the personalized asset mixture comprises a weighted mixture of a plurality of available asset allocations selected from the set of available asset allocations to satisfy the personalized asset mixture for the user.

Clause 2: The computer-implemented method of Clause 1, wherein the set of available asset allocations comprise a set of target date vehicles.

Clause 3: The computer-implemented method of Clause 2, wherein the set of target date vehicles comprises a mutual fund or a collective investment trust.

Clause 4: The computer-implemented method of Clause 1, wherein the metric is one of a plurality of metrics associated with determining ideal equity ratios for users, and wherein accessing the metric value comprises accessing metric values associated with a user for each of the plurality of metrics.

Clause 5: The computer-implemented method of Clause 4, wherein the plurality of metrics comprise objective and subjective metrics.

Clause 6: The computer-implemented method of Clause 4, wherein the plurality of metrics comprises one or more of the following metrics: age, gender, salary, location, savings rate, membership in a defined benefit plan, risk tolerance, target retirement income, assets, match rate, or savings balance.

Clause 7: The computer-implemented method of Clause 1, wherein the set of available asset allocations comprises a subset of available asset allocations selected based on the target asset mixture for the user.

Clause 8: The computer-implemented method of Clause 1, further comprising outputting an indication of the personalized asset mixture for presentation on a display.

Clause 9: The computer-implemented method of Clause 1, further comprising automatically allocating investment funds based on the personalized asset mixture without user input.

Clause 10: The computer-implemented method of Clause 1, further comprising rebalancing an investment account of the user based on the personalized asset mixture.

Clause 11: A system comprising:
an electronic data store configured to store metric values for a set of users, and asset definitions for asset allocations, the metric values corresponding to a plurality of metrics associated with determining equity ratios for the set of users; and
a hardware processor in communication with the electronic data store, the hardware processor configured to execute specific computer-executable instructions to at least:
access from the electronic data store a metric value associated with a user from the set of users, the metric value corresponding to a metric from the plurality of metrics;
determine a target asset mixture for the user based at least in part on the metric value;
identify a set of available asset allocations;
obtain from the electronic data store an asset definition for each of the set of available asset allocations;
map the target asset mixture of the user to the asset definition for each of the set of available asset allocations; and
determine a personalized asset mixture for the user based at least in part on the mapping of the target asset mixture of the user to the asset definition for each of the set of available asset allocations, wherein the personalized asset mixture comprises a weighted mixture of a plurality of available asset allocations selected from the set of available asset allocations to satisfy the personalized asset mixture for the user.

Clause 12: The system of Clause 11, wherein the set of available asset allocations comprise a set of target date vehicles.

Clause 13: The system of Clause 12, wherein the set of target date vehicles comprises a mutual fund or a collective investment trust.

Clause 14: The system of Clause 11, wherein the hardware processor is further configured to access a plurality of metric values associated with the user and corresponding to the plurality of metrics.

Clause 15: The system of Clause 11, wherein the set of available asset allocations comprises a subset of asset allocations selected based on the target asset mixture for the user.

Clause 16: The system of Clause 11, wherein the personalized asset mixture comprises a selection of a single available asset building block that maps to the asset mixture of the user.

Clause 17: The system of Clause 11, wherein the hardware processor is further configured to output an indication of the personalized asset mixture for presentation on a display.

Clause 18: The system of Clause 11, wherein the hardware processor is further configured to allocate investment funds based on the personalized asset mixture.

Clause 19: The system of Clause 11, wherein the hardware processor is further configured to rebalance an investment account of the user based on the personalized asset mixture.

Clause 20: The system of Clause 11, wherein the plurality of metrics comprise objective and subjective metrics.

Clause 21: The system of Clause 11, wherein the plurality of metrics comprises one or more of the following metrics: age, gender, salary, location, savings rate, membership in a defined benefit plan, risk tolerance, target retirement income, assets, match rate, or savings balance.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
as implemented by an interactive computing system configured with specific computer-executable instructions,
identifying a plurality of data stores storing a plurality of metric values for a set of users, the plurality of metric values corresponding to a plurality of metrics associated with determining ideal equity ratios for the set of users;
determining a first subset of the plurality of metric values stored by a first subset of the plurality of data stores are accessible, the first subset of the plurality of metric values corresponding to a first subset of the plurality of metrics;
electrically communicating, via a network, with the first subset of the plurality of data stores;
obtaining, from the first subset of the plurality of data stores the first subset of the plurality of metric values based on electronically communicating with the first subset of the plurality of data stores;
providing, to a machine learning model, the first subset of the plurality of metrics and account data associated with the set of users;
obtaining, from the machine learning model, an output of the machine learning model indicating a second subset of the plurality of metrics based at least in part on filtering the first subset of the plurality of metrics;
in response to obtaining the output of the machine learning model, generating a plurality of metric value combinations based at least in part on the second subset of the plurality of metric values,
generating, for each respective metric value combination of the plurality of metric value combinations, a respective target asset mixture for respective assets that links a respective synthetic asset allocation to the respective metric value combination;
generating a set of available asset allocations comprising a mixture of equities and fixed income allocations, each asset mixture of a set of asset mixtures linking a respective available asset allocation of the set of available asset allocations to one or more respective metric values of a respective metric from the plurality of metrics;
obtaining a set of definitions for the set of available asset allocations;
dynamically mapping, for each respective metric value combination of the plurality of metric value combinations, the respective target asset mixture to the set of definitions;
generating, for each respective metric value combination of the plurality of metric value combinations, a respective personalized asset mixture for the respective assets based at least in part on dynamically mapping the respective target asset mixture to the set of definitions to obtain a plurality of personalized asset mixtures, wherein the respective personalized asset mixture comprises a respective weighted mixture of a respective plurality of available asset allocations selected from the set of available asset allocations to satisfy the respective target asset mixture;
dynamically generating a comprehensive set of asset mixtures based at least in part on the plurality of personalized asset mixtures, wherein the comprehensive set of asset mixtures links each of the plurality of metric value combinations to a respective personalized asset mixture of the plurality of personalized asset mixtures;
receiving, from a user computing device, a request; and
in response to the request, outputting, to the user computing device, a database comprising the comprehensive set of asset mixtures, wherein the database indicates metric values of a first user and metric values of a second user are linked to a same personalized asset mixture of the plurality of personalized asset mixtures.

2. The computer-implemented method of claim 1, further comprising:
verifying an account associated with the user computing device, wherein outputting the database comprises, in response to verifying the account associated with the user computing device, transmitting, to the user computing device, the database.

3. The computer-implemented method of claim 1, wherein outputting the database comprises transmitting, to the user computing device, the database over the network.

4. The computer-implemented method of claim 1, wherein generating, for each respective metric value combination of the plurality of metric value combinations, the respective target asset mixture comprises:
simulating a distribution of consumption for the respective metric value combination; and
generating the respective target asset mixture based at least in part on simulating the distribution of consumption for the respective metric value combination.

5. The computer-implemented method of claim 1, wherein generating, for each respective metric value combination of the plurality of metric value combinations, a respective personalized asset mixture comprises:
providing the plurality of metric value combinations to a minimization function, wherein the minimization function outputs the respective personalized asset mixture.

6. The computer-implemented method of claim 1, wherein the plurality of metrics comprises an age metric and one or more of: a gender metric, a salary metric, a location metric, a savings rate metric, a defined benefit plan metric, a risk tolerance metric, a target retirement income metric, an assets metric, a match rate metric, or a savings balance metric.

7. The computer-implemented method of claim 1, further comprising:
training the machine learning model to identify particular metrics as predicted to influence a target asset mixture, wherein the machine learning model is configured to output the second subset of the plurality of metrics.

8. The computer-implemented method of claim 7, further comprising:
accessing the machine learning model; and
identifying the second subset of the plurality of metrics based at least in part on an output of the machine learning model.

9. The computer-implemented method of claim 1, further comprising:
 monitoring the set of available asset allocations;
 identifying an updated set of available asset allocations based at least in part on monitoring the set of available asset allocations;
 dynamically remapping, for each respective metric value combination of the plurality of metric value combinations, the respective target asset mixture to an updated set of definitions for the updated set of available asset allocations;
 generating, for each respective metric value combination of the plurality of metric value combinations, an updated respective personalized asset mixture for the respective assets based at least in part on dynamically remapping the respective target asset mixture to the updated set of definitions; and
 updating the comprehensive set of asset mixtures based at least in part on generating, for each respective metric value combination of the plurality of metric value combinations, the updated respective personalized asset mixture.

10. The computer-implemented method of claim 1, wherein the set of available asset allocations comprises a set of target date vehicles.

11. The computer-implemented method of claim 10, wherein a target date vehicle of the set of target date vehicles comprises a mutual fund or a collective investment trust.

12. The computer-implemented method of claim 1, wherein the set of users is a first set of users, wherein the first user and the second user correspond to a second set of users, and wherein assets of the first user and assets of the second user are allocated according to the same personalized asset mixture.

13. The computer-implemented method of claim 1, wherein the plurality of metrics comprises one or more objective metrics and one or more subjective metrics.

14. The computer-implemented method of claim 1, wherein generating, for each respective metric value combination of the plurality of metric value combinations, the respective target asset mixture comprises generating, for each respective metric value combination of the plurality of metric value combinations, the respective target asset mixture to obtain a plurality of target asset mixtures, the computer-implemented method further comprising:
 comparing each target asset mixture of the plurality of target asset mixtures and a corresponding personalized asset mixture of the plurality of personalized asset mixtures; and
 determining each target asset mixture of the plurality of target asset mixtures is within a threshold deviation from the corresponding personalized asset mixture of the plurality of personalized asset mixtures based at least in part on comparing each target asset mixture of the plurality of target asset mixtures and a corresponding personalized asset mixture of the plurality of personalized asset mixtures.

15. The computer-implemented method of claim 1, wherein generating, for each respective metric value combination of the plurality of metric value combinations, the respective target asset mixture comprises generating, for each respective metric value combination of the plurality of metric value combinations, the respective target asset mixture to obtain a plurality of target asset mixtures, wherein the set of available asset allocations comprises a subset of available asset allocations selected based at least in part on the plurality of target asset mixtures.

16. The computer-implemented method of claim 1, further comprising outputting an indication of the comprehensive set of asset mixtures for presentation on a display of the user computing device.

17. The computer-implemented method of claim 1, wherein determining the first subset of the plurality of metric values are accessible comprises:
 determining a user computing device can access the first subset of the plurality of metric values.

18. The computer-implemented method of claim 1, wherein the plurality of personalized asset mixtures comprises a personalized multi-factor asset mixture, the computer-implemented method further comprising:
 determining a single-factor asset mixture, wherein the single-factor asset mixture is based at least in part on a particular metric value of the plurality of metric values;
 comparing the personalized multi-factor asset mixture and the single-factor asset mixture; and
 determining the personalized multi-factor asset mixture is within a threshold deviation from the single-factor asset mixture based at least in part on comparing the personalized multi-factor asset mixture and the single-factor asset mixture.

19. A system comprising:
 an electronic data store storing definitions for asset allocations;
 memory storing specific computer-executable instructions; and
 a hardware processor in communication with the electronic data store, wherein execution of the specific computer-executable instructions by the hardware processor causes the hardware processor to at least:
  identify, by the hardware processor, a plurality of data stores storing a plurality of metric values for a set of users, the plurality of metric values corresponding to a plurality of metrics associated with determining equity ratios for the set of users;
  determine, by the hardware processor, a first subset of the plurality of metric values associated with a first user from the set of users and stored by a first subset of the plurality of data stores are accessible, the first subset of the plurality of metric values corresponding to a first subset of the plurality of metrics;
  electronically communicate, by the hardware processor, via a network, with the first subset of the plurality of data stores;
  obtain, by the hardware processor, from the first subset of the plurality of data stores the first subset of the plurality of metric values based on electronically communicating with the first subset of the plurality of data stores;
  provide, by the hardware processor, to a machine learning model, the first subset of the plurality of metrics and account data associated with the first user;
  obtain, by the hardware processor, from the machine learning model, an output of the machine learning model indicating a second subset of the plurality of metrics based at least in part on filtering the first subset of the plurality of metrics;
  in response to obtaining the output of the machine learning model, generate, by the hardware processor, a target asset mixture for assets of the first user that links a synthetic asset allocation to the second subset of the plurality of metrics;
  obtain, by the hardware processor, a set of available asset allocations, each asset mixture of a set of asset mixtures linking a respective available asset allocation of the set of available asset allocations to a respective metric value of a respective metric from the plurality of metrics;

obtain, by the hardware processor, from the electronic data store a respective definition for each respective available asset allocation of the set of available asset allocations to obtain a set of definitions;

generate, by the hardware processor, a first personalized asset mixture for the assets of the first user based at least in part on mapping the target asset mixture to the set of definitions, wherein the first personalized asset mixture for the assets of the first user comprises a weighted mixture of a plurality of available asset allocations selected from the set of available asset allocations to satisfy the first personalized asset mixture for the assets of the first user;

obtain, by the hardware processor, from a computing system, a request for an asset mixture for assets of a second user of the set of users; and in response to determining a metric value associated with the second user corresponds to the metric value associated with the first user and linking the metric value associated with the first user to the first personalized asset mixture for the assets of the first user, output, by the hardware processor, to the computing system, the first personalized asset mixture for the assets of the second user.

20. The system of claim 19, wherein execution of the specific computer-executable instructions by the hardware processor further causes the hardware processor to at least:

identify an update to the metric value associated with the second user; and identify a second personalized asset mixture for the assets of the second user in response to identifying the update to the metric value associated with the second user.

* * * * *